May 28, 1935.  H. JEZLER  2,003,081
VALVE MECHANISM
Filed Dec. 10, 1932  4 Sheets-Sheet 2
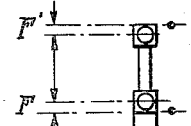 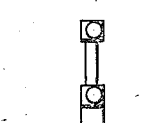 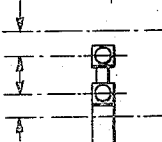 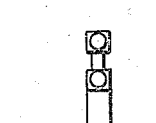
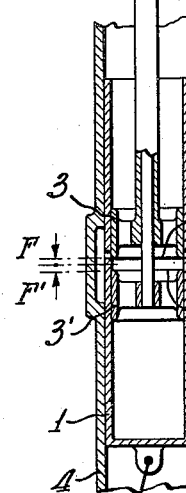 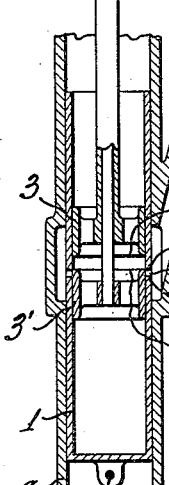 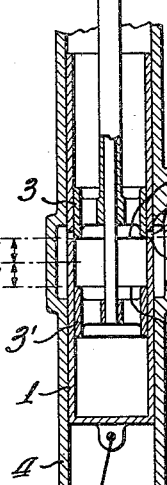 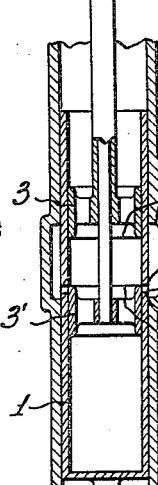
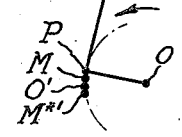 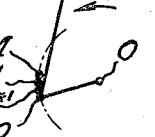 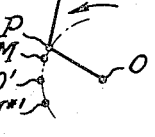 
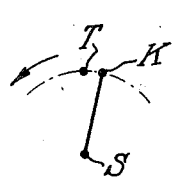 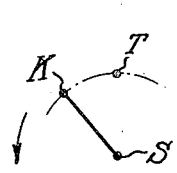 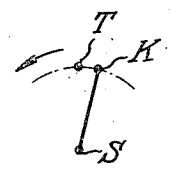 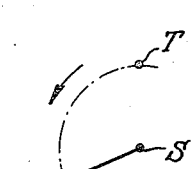
INVENTOR
Hubert Jezler
BY
Dean, Fairbank, Hirsch, Foster
ATTORNEYS May 28, 1935.  H. JEZLER  2,003,081

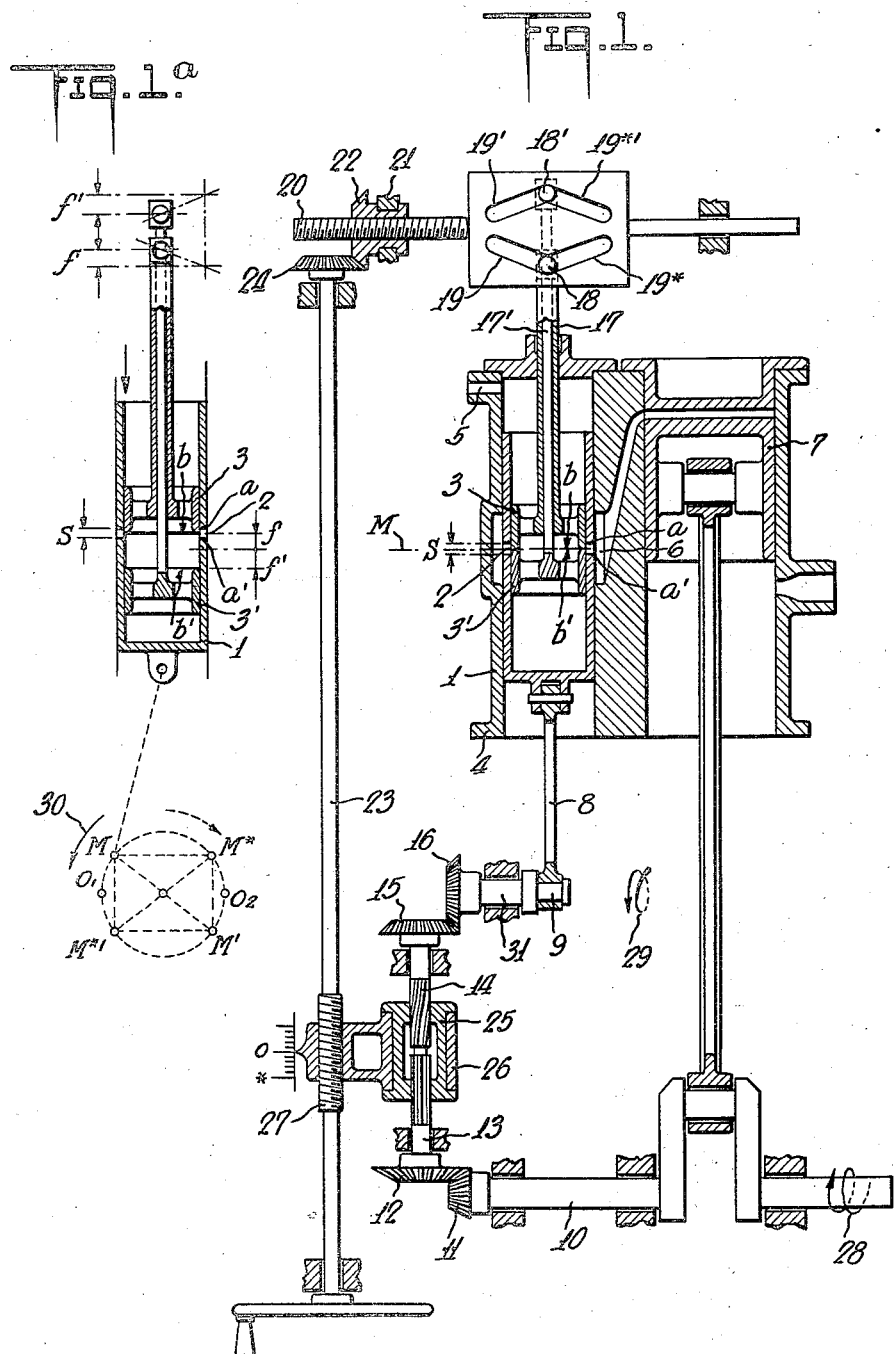

VALVE MECHANISM

Filed Dec. 10, 1932  4 Sheets-Sheet 4

Patented May 28, 1935

2,003,081

UNITED STATES PATENT OFFICE 2,003,081

VALVE MECHANISM

Hubert Jezler, Zurich, Switzerland

Application December 10, 1932, Serial No. 646,699
In Germany December 14, 1931

9 Claims. (Cl. 121—142)

The invention relates to the variable control of the admission and exhaust of the operative medium in two cycle piston engines. In such mechanism the control members continuously moving in the operative medium must be as simple as possible, which is particularly essential at high temperatures of the operating medium. High admission pressures demand shorter admission periods and the tendency to utilize the entire work of expansion in a single cylinder also requires a reduction of the admission period. The valve gear must operate as accurately as possible for a very early cut-off and must also be suitable for long periods of admission. Very quick opening and closing motions as well as a good overlap are necessary. The internal as well as external parts must be few in number and it is of paramount importance to reduce the weight and speed of the reciprocating valve operating parts.

According to the present invention these conditions are satisfied in that the mechanism consists of a valve member having a passage of fixed or invariable area actuated from the driving shaft and a normally stationary or port member with a variable passage defining the opening controlled by the valve.

The valve member is preferably so arranged that it opens and closes the port both during its forward stroke and during its return stroke and is driven at half the speed of rotation of the driving shaft. As an important feature the normally stationary or port member has the ports formed between opposed edges which are simultaneously adjustable toward or from each other, symmetrically with respect to the mid position of the valve when varying the passage section. Simultaneously with this adjustment there is effected a variation of the angular position between the driving shaft and the control shaft. This interrelation may for example be such that the time point of opening remains wholly and substantially unchanged. The member which determines the opening section may include two parts movable relatively toward or away from each other.

Figure 2:
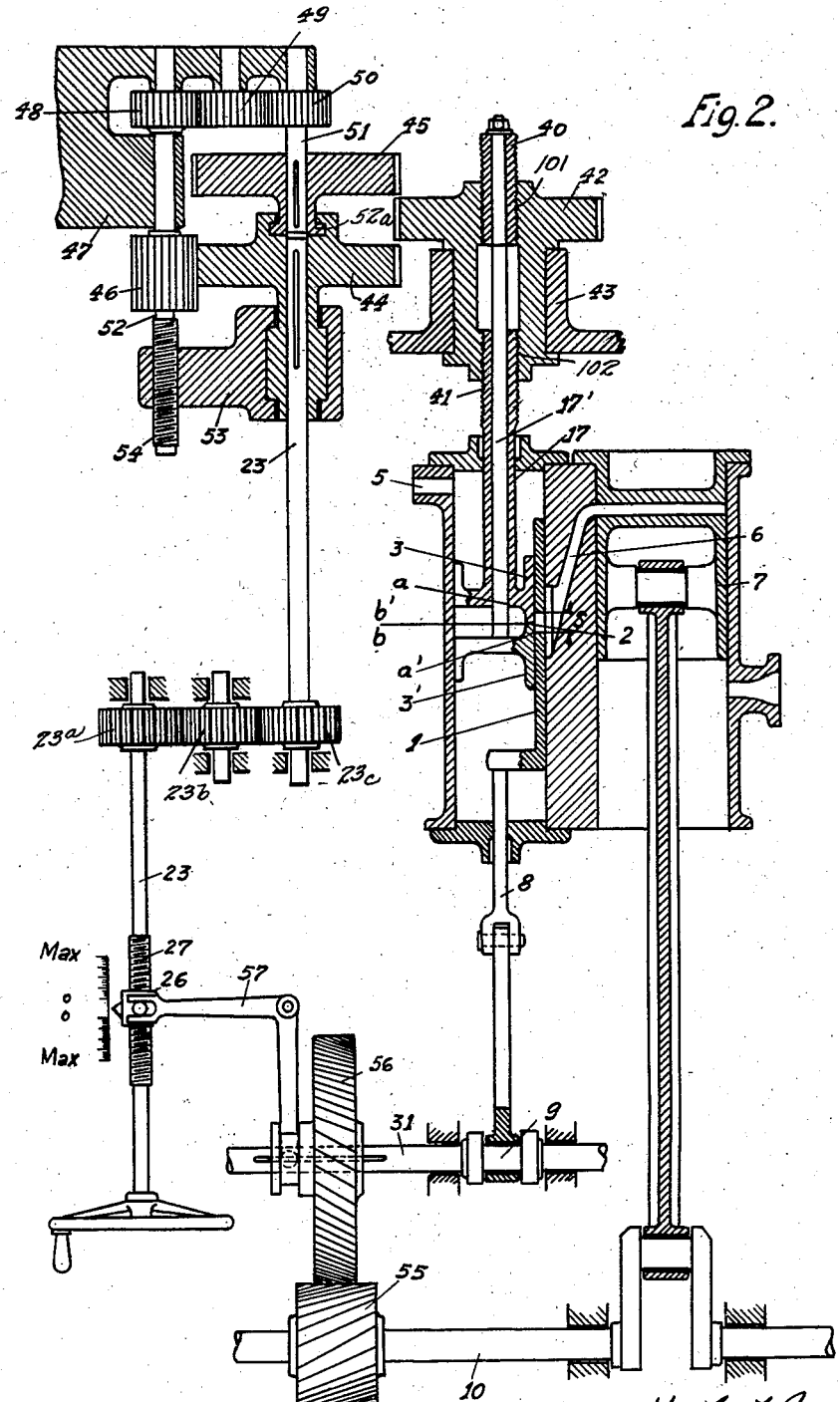
Figure 3:
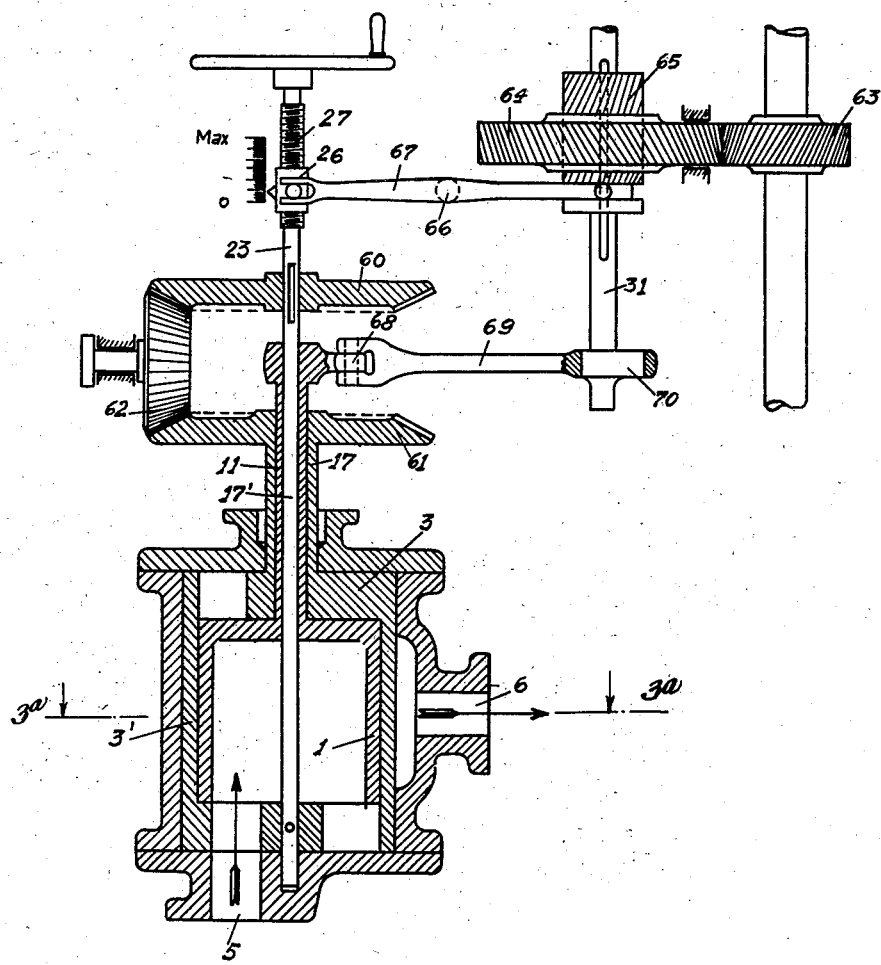
Figure 3A:
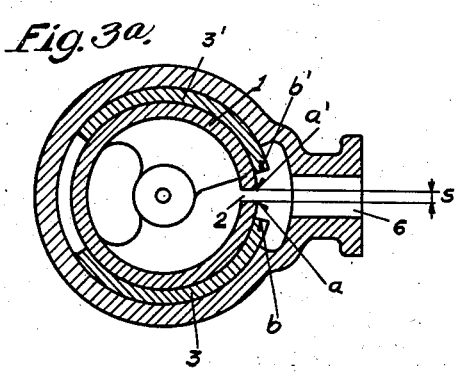

Forms of constructions of the subject of the invention are shown by way of example in the accompanying drawings wherein Fig. 1 is a sectional plan view of a single acting uniflow steam engine showing my improved admission valve gear with the cut-off slides in closed position, Fig. 1a is a sectional plan view of the valve gear mechanism with the cut-off slides in partially open position and illustrating diagrammatically in dotted lines the cycles of the valve gear motion and the crank motions for the piston, Fig. 1b is a view similar to Fig. 1a, illustrating the position of the parts at the moment of pre-admission at short admission, Fig. 1c is a similar view at the moment of cut-off, Figs. 1d and 1e are views corresponding to Figs. 1b and 1c and showing corresponding positions of the parts where a considerably longer period of admission is required, Fig. 2 is a view similar to Fig. 1, illustrating a modified form of the invention, Fig. 3 is a view generally similar to Fig. 1 but illustrating a type of construction using an oscillating valve, Fig. 3a is a sectional view on the line 3a—3a of Fig. 3.

In Figs. 1 and 1a is illustrated the drive of the valve from the driving shaft by means of pairs of gears having a driving ratio of 2 to 1 with the interposition of an adjustable coupling. The setting of the normally stationary member consisting of two parts for determining the opening section (hereinafter referred to as the charge producer) by means of control cams. In addition the adjustable coupling and the control cams are operatively connected by a common setting means. The illustration relates to the control of the inlet of a single acting continuous current steam engine.

The inlet member consists essentially of a tubuar valve 1 with the inlet port 2 of a width s, in combination with the two piston-like charge producers 3 and 3'. The port is interrupted by a single step, not shown in the drawings, for connecting together the two valve halves. The valve 1 moves in the valve casing 4 on which the steam inlet pipe is indicated at 5 and the supply passage to the working cylinder by 6. The illustration is at the dead point of the working piston 7, the charge producer 3, 3' being closed in Fig. 1 and open for a certain charge in Fig. 1a. The controlling edges of the valve port are indicated by $a$, $a'$ and those of the two parts of the charge producer by $b$, $b'$. The drive of the valve 1 is effected by the thrust rod 8 from the crank 9. The control shaft 31 is driven from the driving shaft 10 by means of the toothed wheel pair 11, 12, the shafts 13, 14, coupled together, and the toothed wheel pair 15, 16. By the toothed wheel transmission there is obtained a transmission of the engine revolutions to the control shaft revolutions in the ratio of 2:1. In the arrangement here shown the direction of rotation of the control shaft is anticlockwise when the driving shaft, looking in the same direction, rotates clockwise.

The charge producers 3, 3' are connected by a hollow rod 17 and a rod 17' to the rollers 18, 18' which run in guide slots 19, 19'. These slots are rigidly connected to the screw spindle 20 with which engages as a nut the bevel wheel 22 mounted in 21. 22 engages with the bevel wheel 24 mounted on the control spindle 23. By turning the control spindle the guide slots are moved at right angles to the valve axis and thus the two parts of the charge producer are separated or drawn together.

The coupling between the shafts 13 and 14 is effected by the sleeve 25 which at one end is connected to the straight grooved portion of the shaft 13 and at the other end to the inclined grooved portion of the shaft 14 in the manner of a nut 25 and is mounted in the ring 26 which, serving as a nut, can be displaced by means of a thread 27 on the valve control spindle 23.

The device described thus permits of effecting, simultaneously with the opening of the charge producer, a variation of the relative position of the driving crank and the control crank. In the position shown in Fig. 1 the two edges $b$ and $b'$ of the charge producer are in their middle position M and the centre line of the valve port 2 (always assuming the dead point position of the working piston) also coincides accurately with M. The driving crank lies in the plane of the drawing, the control crank being at right angles thereto.

It will be seen from Fig. 1a that when the cut-off slides are opened by $f$, plus $f'$, the slide valve 1 (main crank at dead center) must also be displaced from its center position by about $f$ (the exact amount of this displacement depending upon the conditions required in regard to pre-admission). Each opening of the charge producer corresponds with a definite turning of the control crank 9 relatively to its direction of rotation from its position at right angles to the driving crank in the zero position.

For the directions of rotation indicated by the arrows 28, 29, 30 the upwardly directed control crank $O$, $O_1$, at right angles to the plane of the paper in the zero position, must be turned through the angle $O_1$, $O$, $M$ away from its own direction of rotation.

For following the control operation attention is drawn to Fig. 1a. In the position shown the valve will be seen during its movement towards the control crank corresponding with the rotation of the control crank in the direction of the full line arrow. The leading edge $a'$ has already passed the edge $b$ by the amount of the linear advance (which here is about equal to half the width of the port 2). The pre-admission took place when the edge $a'$ coincided with $b$. Whilst the working piston moves from its dead point position at the cylinder head towards the crank an inflow occurs until the edge $a$ of the valve closes with the edge $b'$ of the charge producer. This is the directly opposite position to the pre-admission position as regards the mid-position $O_1$. After a path of 180°, calculated from M, the control crank has reached the position M' in which the edges $a$ and $b'$ are relatively to one another in the same way as the edges $a'$ and $b$ in the position shown, whilst the valve has moved away from the control crank. Meanwhile the driving crank has made a complete revolution of 360°; the working piston is again in its dead point position at the cylinder head and the cylinder receives during the return stroke of the valve its second charge, which is closed shortly after passing the position M*.

On one stroke of the piston the admission opening is defined by the edges $a'$ and $b$, and the closing of this admission port is by the edges $a$ and $b'$ on the movement of the slide valve toward the control crank, whereas on the next stroke of the piston the opening is effected by the edges $a$ and $b'$ and the closing by the edges $a'$ and $b$ as the main control valve travels away from its control crank.

In Figs. 1 and 1a as well as in Figs. 2, and 3a, the valve gear mechanism is shown in a position corresponding to a dead center position of the working piston. The moment of pre-admission is already passed and in the relative exhibition of the fixed and movable edges of the valve mechanism will be noticed the amount of the linear lead.

In Figs. 1b to 1e the example as based on Fig. 1 is shown as follows: Figs. 1b and 1c relate to a comparatively small period of admission. Fig. 1b illustrates the moment of pre-admission while Fig. 1c shows the moment of the cut-off. In Figs. 1d and 1e the corresponding moments are illustrated for a considerably longer period of admission. The numbers and letters of reference in Figs. 1b to 1e are the same as used in Fig. 1 and in particular Fig. 1a. Special reference is made to the designation M as used in Fig. 1a (for the position of the valve crank pin in dead center position of the working piston) and M*' (for the symmetric position of the valve crank pin shortly before the cut-off).

The designations M' and M* referring to the second half of a revolution of the valve crank pin have been left off in these figures.

P designates the position of the valve crank pin in the moment of pre-admission (Figs. 1b and 1d) and in the moment of cut-off (Figs. 1c and 1e). Furthermore SK represents the working crank and T the over side dead center position of the working crank pin.

In Figs. 1b and 1d the two cut-off slides 3 and 3' are displaced by the amounts $f$ and $f'$ from their center-respectively closing position. Valve 1 is placed such that its edge $a'$ opens the steam passage when passing the fixed edge $b$ of the cut-off slide 3. The valve crank pin P is yet in a position advanced in relation to M by the amount of the angle MOP coordinated to the dead center of the working crank.

The angle MOP corresponds to the polar pre-admission, which appears in the illustration of the working crank as angle TSK. Since the valve crank pin rotates at half speed of the working crank, the angle MOP is equal ½ of the angle TSK. The valve crank pin P now follows a path over M, the absolute dead center $O_1$ and M*' symmetric to M until position P as indicated in Figs. 1c and 1e is reached. This is the moment of cut-off, i. e. the position in which the edge $a$ of valve 1 in cooperation with edge $b'$ of the cut-off slide 3' closes the steam passage. The working crank has correspondingly reached position K as indicated in Figs. 1c and 1e. The angular path of P from position as shown in Figs. 1b, 1d, respectively, to position as shown in Figs. 1c, 1e, respectively is one-half of the corresponding angular path of K. The angles $O_1OM$ indicate the angle of torsion by which the valve crank is moved out of the center position $OO_1$ perpendicular to the working crank if the cut-off slide is moved by an amount $f$. This torsion in case $1d$ and $1e$ is larger than in case $1b$ and $1c$ because the displacement is also assumed larger. Especially the freedom of choice for the inclination and form of the valve control curves 19, 19' (Fig. 1) permits the designer to choose relations between the displacement $f$ and the angle of torsion $O_1OM$ such, that with respect to pre-admission a desired positive law (for example also a constant polar pre-admission) will be followed. Once the relations between position M and T are correctly determined it is obvious that the relations of P and K (Figs. 1b and 1d) are also fixed. Consequently by proper choice of angle of torsion of the valve crank pin and displacement $f$ in relation to each other it is possible without other means to maintain the angles MOP and TSK respectively corresponding to pre-admission constant for any cut-off.

It will be seen that the control operation particularly with small charges takes place in the vicinity of the highest valve speeds whereby favourable conditions of opening and closing are obtained. Of quite particular importance is the circumstance that in the steam space only the light and simple tubular valve 1 is moved, whereas the charge producers 3, 3', adjustable for the purpose of varying the charge, depend on the operation of the engine. The reciprocating parts are restricted to the valve, including the valve rod and the portion of the valve thrust rod. The guide slots 19 also depend on the operation of the engine; they can be made extremely precise and at the same time strong. The adjustable coupling 13, 14, 26 only has to transmit control forces; it may therefore also be constructed extremely precise and robust and in addition is not subjected to any forces which change their direction. All the remaining control members are of the simplest kind imaginable.

By this mechanism it is possible as regards pre-admission to effect a predetermined course extremely accurately dependently on the charge degree. Particularly it is also possible (with a restriction in the direct vicinity of the zero charge which can practically hardly be observed) to obtain an accurately constant pre-admission for the whole range. For forward and reverse drive it is possible to produce complete symmetrical ratios. The range of control is unlimited and the requirement of a very high maximum charge does not in any way influence the efficiency and accuracy of the control in the case of very small charges.

Figs. 2, 3, and 3a show other examples of construction of the subject of the invention. In these figures the parts already shown in Figs. 1 and 1a are indicated by the same references and are only again explained in so far as this is necessary in the other form of construction.

Fig. 2 shows an example of the control with a slide valve, adjustment of the charge producer by means of left and right hand screws and turning between driving crank and control crank by means of movable worm wheels. The charge producer in this case consists of two parts, 3, 3' constructed in the manner of a slide valve which are connected by a rod 17' and a hollow rod 17 to parts 40, 41 carrying opposite screw threads. These parts engage with the hub of the toothed wheel 42 having left and right hand screws 101 and 102. The toothed wheel 42 may, according to the setting of the control spindle 23, be brought into engagement with the toothed wheel 44 or 45 by means of the following device.

The toothed wheel 44 is keyed for axial movement on the control spindle 23. With the toothed wheel 44 there engages constantly the pinion 46 of which the shaft 52, mounted in 47, carries the toothed wheel 48 which through the intermediate wheel 49 gears with the toothed wheel 50. This is mounted on the shaft 51 on which the toothed wheel 45 is keyed for axial movement. 44 and 45 are immovable axially relatively to one another but are freely rotatable relatively to one another. The hub of the wheel 44 is rotatable on the part $52a$ but is axially immovable. Part 53 is mounted as a nut on the screwed portion 54 of shaft 52.

The transmission of the movement from the driving shaft to the control shaft 31 in the proportion 2:1 is effected by a skew wheel pair 55, 56, the latter being connected to the control shaft 31 in an axially movable manner by a key and groove. The bell crank lever 57 is connected at one end by a fork and pin to the hub of the wheel 56 and at the other end to a nut 26 on the screwed portion 27 of the control spindle.

By turning the control spindle a rotation in opposite directions is produced between the driving crank and the control crank; simultaneously for example 44 comes into engagement with 42 whereby the opening of the charge producer takes place. In this manner there is for example set the forward movement from 0 charge to maximum charge.

In order to set for reverse movement the control spindle is turned from the middle position shown in the opposite direction whereby a turning also takes place in the opposite direction between the driving crank and the control crank. Now however the toothed wheel 45 comes into engagement with 42 so that in spite of the turning of the control spindle in the opposite direction the toothed wheel 42 is turned in the same direction as in the first case and thus the charge producer is opened as before.

According to the selection of the pre-admission an interruption can be provided between the change of engagement of 44 and 45 with 42 by dimensioning the distance between 44 and 45 so that on changing from forward drive to reverse a turning of the control crank relatively to the driving crank and thus a movement of the valve relatively to the closed charge producer, stationary in the mid-position, is possible.

Fig. 3 shows an example of construction with oscillating valve. The two parts 3, 3' of the charge producer are also constructed in the manner of an oscillatory valve. Their axes of rotation 17 and 17' are respectively connected to the bevel wheels 61, 60. The latter is rigidly connected to the control spindle 23 and the former is connected thereto by means of the intermediate wheel 62. The transmission of movement from the driving shaft to the control shaft 31 is effected in the proportion 2:1 by the spur wheels 63, 64. The latter is seated on an inclined grooved bush 65 which is connected in an axially movable manner to the control shaft 31 by a key and groove. The lever 67, pivotally mounted at 66, is connected by a fork and pin to the bush 65 and to the nut 26 engaging with the screw portion 27 of the control spindle. The valve receives its oscillating movement by means of the hollow shaft 11, the crank 68, the eccentric rod 69 and the eccentric 70 from the control shaft 31.

In this example a reversal has not been considered.

What I claim is:

1. The combination with a single acting reciprocating engine having a piston and a crank shaft, of a motive fluid control mechanism including a valve having a passage of invariable size for the motive fluid, means for imparting to said valve a back and forth movement with one stroke for each two strokes of the engine piston, a pair of normally stationary members coacting with said valve to control the flow of motive fluid through said passage, means for varying the time of the stroke of the valve in respect to that of the piston, and means for simultaneously moving said members toward or from each other.

2. The combination with a single acting reciprocating engine having a piston and a crank shaft, of a control mechanism including a valve having a port of fixed and predetermined size for the passage of the motive fluid, a pair of spaced normally stationary members acting alternately to uncover and cover said port during each stroke of said valve, means for imparting a back and forth movement to said valve with one stroke during each two strokes of the engine piston, means for varying the time of the stroke of the valve in respect to that of the piston, and means for adjusting said members toward or from each other to retard the time of closing said port while maintaining substantially constant the time of opening thereof.

3. The combination with a single acting reciprocating engine, having a piston and a crank shaft, of a control mechanism including a valve, a crank for operating said valve, means for rotating said crank at one half the angular velocity of the engine crank shaft, said valve having a port of fixed and predetermined size for the motive fluid, means defining a motive fluid passage for registry with said port, and means for simultaneously adjusting the angular position of said crank in respect to the engine crank, and widening or narrowing said passage.

4. The combination with a single acting reciprocating engine having a piston and a crank shaft, of a control mechanism including a valve, a crank for operating said valve, means for rotating said crank at one half the angular velocity of the engine crank shaft, said valve having a port of fixed and predetermined size for the motive fluid, means for adjusting the angular position of said crank in respect to the engine crank, a pair of normally stationary members acting alternately to uncover and cover said port during movement of said valve in each stroke, and means for moving said members toward or from each other upon change in the relative angular positions of said crank and the engine crank shaft.

5. The combination with a reciprocating engine having a piston and a crank shaft, of a control mechanism including a valve, a crank for operating the same, two to one gearing for driving the crank from the crank shaft of the engine to give to the valve a back and forth movement with one stroke for each two piston strokes, an adjusting coupling for varying the angular position of said crank in respect to the engine crank shaft, said valve having a port of fixed and predetermined cross-sectional area for the motive fluid, a valve casing for said valve, and means in said casing for maintaining substantially constant the time at which said port is opened for all relative angular positions of said crank and the crank shaft.

6. The combination with a reciprocating engine having a piston and a crank shaft, of a control mechanism including a valve having a port of fixed and predetermined area, a valve casing having a passage of variable width with which said port registers once during each stroke of the valve, means for imparting to said valve a back and forth movement with one stroke for each two strokes of the engine piston, means for varying the relative positions of the piston and valve in their respective strokes, and means for varying the width of said passage in accordance with variations in the relative positions of the valve and piston in their strokes.

7. The combination with a reciprocating engine having a piston and a crank shaft, of a control mechanism including a valve having a port of fixed and predetermined cross-sectional area, a pair of members normally stationary but adjustable toward and from each other to form a passage registering with said port once during each stroke of said valve, means for imparting to said valve a back and forth movement with one stroke for each two strokes of the engine piston, means for advancing or retarding the valve in respect to the piston, and means for automatically and simultaneously moving said members toward or from each other to vary the width of said passage.

8. The combination with a reciprocating engine having a piston and a crank shaft, of a control mechanism including a valve having a port of fixed and predetermined cross-sectional area, means for imparting to said valve a back and forth movement, a pair of members normally stationary and movable in opposite directions toward and from mid-position of the valve, said members having edges coacting with said port to effect opening and closing of the latter, means for varying the position of the valve in its stroke in respect to the position of the piston, and means for simultaneously and automatically moving said members toward or from each other.

9. The combination with a single acting reciprocating engine having a piston and a crank shaft, of a control mechanism including a valve having a port of fixed and predetermined area, means for imparting to said valve a back and forth movement, a pair of members normally stationary but movable in opposite directions toward and from the mid-position of said port, said members having edges coacting with said port to open and close the latter once during each stroke of the valve, a control member, means actuated by said control member for varying the position of the valve in its stroke in respect to the position of the piston, and means also operated by said control member for adjusting said members toward and from each other.

HUBERT JEZLER.